United States Patent Office 3,592,858
Patented July 13, 1971

---

3,592,858
COLOR STABILIZATION OF HYDROQUINONE ETHERS
Marshall R. Brimer, Kingsport, Tenn., assignor to Eastman Kodak Company, Rochester, N.Y.
No Drawing. Filed Feb. 28, 1969, Ser. No. 803,464
Int. Cl. C07c *41/12*
U.S. Cl. 260—611.5      6 Claims

ABSTRACT OF THE DISCLOSURE

An alkyl or a hydroxyalkyl ether of hydroquinone containing a discoloration-inhibiting amount of a cyclic phosphite.

---

This invention relates to the treatment of hydroquinone ethers and is particularly concerned with the stabilization of alkyl and hydroxyalkyl ethers of hydroquinone against color degradation.

The alkyl and the hydroxyalkyl ethers of hydroquinone are variously utilizable industrially. More specifically, the alkyl ethers of hydroquinone find use, inter alia, as antioxidants and as plasticizers; and they are also employed in carrying out syntheses in the pharmaceutical and dyestuff fields among others. Similar comments apply to the hydroxyalkyl ethers of hydroquinone, which are especially useful in the preparation of polymeric substances such as polyesters and polyurethanes.

A disadvantage of these alkyl and hydroxyalkyl ethers of hydroquinone is their tendency to become discolored. Usually, this discoloration occurs only gradually upon storage of such a hydroquinone ether at ordinary temperatures. As the storage temperature is raised, however, especially to the extent necessary to maintain in the molten condition such a hydroquinone ether that is normally a solid, the rate at which such color deterioration takes place markedly increases.

Such discoloration, as will be appreciated, can seriously limit the suitability of the alkyl or hydroxyalkyl ether of hydroquinone for any contemplated application. In particular, where such a discolored hydroquinone ether is utilized in an organic synthesis or in the production of a polymer, the resulting product such as, for example, a polyester or a polyurethane will also ordinarily be off-color to a similar extent.

Since it is not always feasible or otherwise practicable to utilize the alkyl or hydroxyalkyl ether of hydroquinone soon enough following its preparation to avoid this color degradation, it is clearly desirable to pervent or mitigate such discoloration insofar as possible. In addition, there are definite economic and other advantages in storing shipping and processing such a hydroquinone ether in the liquid or molten state.

It has been found that these objectives can be readily accomplished, without detriment to the utility of the alkyl or hydroxyalkyl ether of hydroquinone, by incorporating a cyclic phosphite of a particular type with such hydroquinone ether.

In accordance with the present invention, there is thus provided a composition comprising (1) a hydroquinone ether of the formula

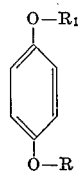

wherein R is an alkyl or a hydroxyalkyl group, and $R_1$ is H or an alkyl or a hydroxyalkyl group; and (2), in an amount effective to inhibit the discoloration of such hydroquinone ether, a cyclic phosphite of the Formula a

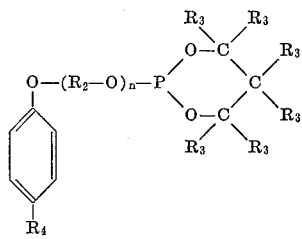

wherein $R_2$ is an alkylene group, $n$ is 0 or 1, $R_3$ is H or an alkyl group, $R_4$ is H or a —$OR_5$ group, and $R_5$ is H or an alkyl or a hydroxyalkyl group or a cyclic phosphite grouping having the structure

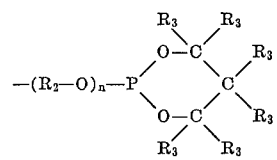

or the Formula b

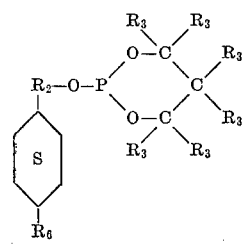

wherein $R_6$ is H or an alkyl or a hydroxyalkyl group or a cyclic phosphite grouping having the structure

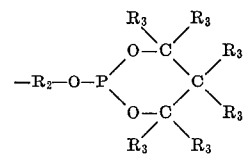

and S indicates that the ring is saturated.

As will be apparent, the hydroquinone ether to be so color-stabilized may be a mono-ether or a di-ether. Such mono-ether may be a monoalkyl or a mono-hydroxyalkyl ether of hydroquinone; and such di-ether may be a dialkyl or a di-hydroxyalkyl or a monoalkyl-mono-hydroxyalkyl ether of hydroquinone.

The alkyl group in any such ether may be variously substituted so long as any such substituent does not interfere with or otherwise adversely affect the utility of the given hydroquinone ether or the discoloration-inhibiting effect of the cyclic phosphite incorporated with such hydroquinone ether. In addition, such an alkyl group may be a cycloalkyl or an aralkyl group, which may each likewise be similarly substituted. Generally, however, such alkyl group will be essentially aliphatic in nature and ordinarily will contain 1 to 4 carbon atoms.

Much the same considerations apply to the hydroxyalkyl group in any such ether, the alkylene portion of which similarly will generally be essentially aliphatic in nature and will also usually contain 1 to 4 carbon atoms. In the same manner the hydroquinone ring in such an ether may be otherwise substituted but will generally be free of other substituents.

As will be further apparent, the cyclic phosphite utilized to stabilize the indicated hydroquinone ether against color degradation may contain one or two cyclic phosphite groups, which may be attached to an aryl nucleus or to a cycloalkyl nucleus. Where such nucleus is aryl in nature, each cyclic phosphite group may be attached thereto either directly or through an oxyalkylene group. Where such nucleus is cycloalkyl in nature, each cyclic phosphite group is attached thereto through an alkylene group. In addition, when there is only a single cyclic phosphite group, the aryl or cycloalkyl nucleus may be substituted in the para- or the 4-position by an alkyl or a hydroxyalkyl group or, if the nucleus is aryl in nature, by a hydroxy group.

Such a latter alkyl group may be variously substituted or may be a cycloalkyl or an aralkyl group, which may each likewise be similarly substituted, on the same basis as set forth in connection with the description of the hydroquinone ethers to be stabilized. Similar considerations also apply to such a latter hydroxyalkyl group. In each instance, however, the alkyl group and alkylene portion of the hydroxyalkyl group will also generally be essentially aliphatic in nature and will ordinarily contain 1 to 4 carbon atoms.

The indicated attaching alkylene group and the alkylene portion of the indicated attaching oxyalkylene group may each also be so substituted but generally will likewise be essentially aliphatic in nature and will also usually contain 1 to 4 carbon atoms. Moreover, the aryl ring or the cycloalkyl ring in such a cyclic phosphite may also be otherwise substituted in the same manner but will ordinarily be free of other substituents.

Each alkyl group that may be attached to a methylene carbon atom of a cyclic phosphite group may be substituted in the manner described above. Again, however, any such alkyl group generally will be essentially aliphatic in nature and usually will contain 1 to 4 carbon atoms.

In this regard it is a feature of the invention that each phosphite group includes a cyclic structure, which appears to impart to the phosphite itself a superior capability for stabilizing the instant alkyl and hydroxyalkyl ethers of hydroquinone against discoloration not only for longer periods of time but also especially at higher temperatures. Those cyclic phosphites in which each dioxaphosphorinane ring is doubly substituted in the 5-position with alkyl groups, preferably those having 1 to 4 carbon atoms, are exceptionally effective in inhibiting the color degradation of such hydroquinone ethers. Most desirably, such two alkyl substituents are methyl groups.

The particular cyclic phosphite to be incorporated with any given alkyl or hydroxyalkyl ether of hydroquinone should, of course, be compatible with the use to be made of such hydroquinone ether. It is thus a further feature of the invention that not only is such compatibility assured but that improved results are also obtained by reason of the similarity or close similarity of the aryl or cycloalkyl nucleus of the cyclic phosphite to the hydroquinone nucleus of the hydroquinone ether. Utilization as the cyclic phosphite of an appropriate phosphite derivative of the hydroquinone ether to be color-stabilized is consequently often to be preferred.

On the other hand, those cyclic phosphites having the indicated cycloalkyl nucleus exhibit good thermal stability themselves at temperatures well above atmospheric or room temperature. They are thus exceptionally useful for the present purpose when the alkyl or hydroxyalkyl ether of hydroquinone is to be maintained at an elevated temperature or in a molten condition for any considerable length of time. The 1,4-cyclohexane-dimethylene-bis(cyclic-2,2-dialkyl-trimethylene phosphite), especially such 2,2-dimethyl phosphite, are particularly attractive in this respect.

The amount of the cyclic phosphite that is employed to carry out the invention should be sufficient to effectively inhibit the discoloration of the alkyl or hydroxyalkyl ether of hydroquinone with which it is incorporated. Generally, the particular amount used will be determined by such factors as the specific hydroquinone ether to be stabilized, the length of time before such ether is to be utilized and the temperature at which it is to be maintained before such utilization, and to some extent the specific cyclic phosphite itself. Such amount may also depend on the degree of color control desired or required; and whether and how long the hydroquinone ether has previously been in storage prior to the incorporation of the cyclic phosphite therewith may constitute a further factor to be considered. Finally, the amount selected should be such as to have little or no significant effect on the use to be made of the hydroquinone ether.

Use of the cyclic phosphite in an amount to provide up to about 0.2% of P based on the weight of the hydroquinone ether is fully satisfactory as a matter of practice. While the cyclic phosphite may be employed in greater quantities, it will ordinarily not be necessary to do so. Generally, an amount of the cyclic phosphite to provide no more than about 0.1% of P on such weight basis will suffice. (The P content of such a cyclic phosphite usually appproximates at least $\frac{1}{10}$ of its weight so that the above-indicated P amounts roughly correspond respectively to about 2% and about 1% of the cyclic phosphite by weight on the basis of the hydroquinone ether.)

Incorporation of the cyclic phosphite with the hydroquinone ether is desirably accomplished by suitably mixing such two components while the ether is in a liquid condition. The resulting liquid admixture may then be appropriately stored as such for subsequent use. Alternatively, when such admixture is molten in nature, it may be solidified and converted into flake or other form for storage. In certain instances, if feasible or otherwise desired, the cyclic phosphite may be combined with the hydroquinone ether following storage of the latter.

Especially advantageous results are obtained in accordance with the invention in the color stabilization of a di-hydroxyalkyl ether of hydroquinone, each hydroxyalkyl group of which has 1 to 4 carbon atoms, with a discoloration-inhibiting amount of a cyclic phosphite having the formula

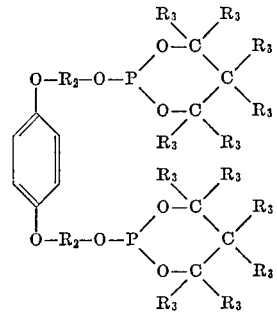

or the formula

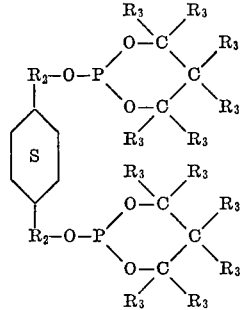

wherein $R_2$ is an alkylene group having 1 to 4 carbon atoms, $R_3$ is H or an alkyl group having 1 to 4 carbon atoms, and S indicates that the ring is saturated. Desirably, each $R_3$ group attached to the carbon atoms in positions 4 and 6 of the dioxaphosphorinane ring is H, with the two $R_3$ groups attached to the 5-position carbon atom each being an alkyl group, preferably a methyl group.

A typical hydroquinone ether of this type comprises the di-($\beta$-hydroxyethyl) ether of hydroquinone, which is utilized extensively in the production of polyesters, polyurethanes, and similar polymeric substances. The stability of such di-hydroxyethyl ether against color degradation, particularly when it needs to be maintained in the molten condition for any appreciable length of time, is markedly and significantly improved by incorporating therewith either p-phenylene - bis(oxyethylene) - bis(cyclic-2,2-dimethyl-trimethylene phosphite) or 1,4-cyclohexane-dimethylene-bis(cyclic-2,2-dimethyl-trimethylene phosphite). Use of about 0.2 to about 0.8% of such phenylene phosphite or use of about 0.1 to about 0.4% of such cyclohexane phosphite, based on the weight of such dihydroxyethyl ether, provides the most beneficial effects.

Unusually good results are also obtained in accordance with the invention by incorporating a discoloration-inhibiting amount of a cyclic phosphite having the formula

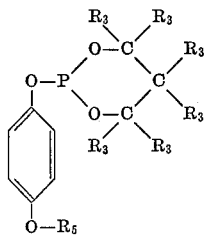

wherein $R_3$ is H or an alkyl group having 1 to 4 carbon atoms, and $R_5$ is an alkyl group havnig 1 to 4 carbon atoms, with a monoalkyl ether of hydroquinone in which such alkyl group has 1 to 4 carbon atoms. Here also each $R_3$ group attached to the carbon atoms in positions 4 and 6 of the dioxaphosphorinane ring is desirably H, with the two $R_3$ groups attached to the 5-position carbon atom each being an alkyl group, preferably a methyl group.

A composition comprising the monomethyl ether of hydroquinone and an appropriate color-stabilizing proportion of cyclic-2,2-dimethyl-trimethylene 4-methoxyphenyl phosphite is exemplary of this latter type of combustion.

The following examples are illustrative of the invention. In each instance the cyclic phosphite percentage is based on the weight of the hydroquinone ether with which such phosphite is incorporated. The APHA color values were determined in accordance with the procedure described on pages 87 to 89 of the tenth edition of "Standard Methods for the Examination of Water" published by the American Public Health Association. An increase in such color value represents an increase in coloration (or discoloration) intensity, with such intensity gradually progressing from colorless to substantially colorless (about 25) to slightly yellow (about 75) to more and more yellow and darkly yellow.

EXAMPLE 1

A batch of di-($\beta$-hydroxyethyl) ether of hydroquinone, which had an APHA color of 10, was divided into a plurality of samples. One such sample was retained as a blank or control; several of the remaining samples were respectively admixed with p-phenylene-bis(oxyethylene)-bis-(cyclic-2,2-dimethyl-trimethylene phosphite) in progressively increasing amounts. The blank sample and such admixed samples were then maintained in molten condition at 135° C. for 148 hours, their individual APHA colors thereafter being determined. The results are set forth in the following table:

| Sample | Phosphite, percent | APHA color |
|---|---|---|
| Control | | 140 |
| A | 0.2 | 45 |
| B | 0.3 | 40 |
| C | 0.4 | 30 |

As these data demonstrate, the cyclic phosphite exerts a substantial discoloration-inhibiting effect on the hydroquinone ether, the magnitude of such color stabilization becoming even more significant when consideration is given to the fact that the indicated conditions constitute an accelerated test.

A practical result is that the di-($\beta$-hydroxyethyl) ether of hydroquinone can be satisfactorily stored and/or shipped or otherwise handled in a liquidified condition, e.g., at a temperature on the order of 5 to 10° C. above its melting point of approximately 95° C., prior to its actual use.

The determinations of the above-indicated APHA color values, as well as those set forth in the following examples also involved di-($\beta$-hydroxyethyl) ether of hydroquinone, were each made on the basis of a solution of 1 gram of the respective sample in 100 ml. of methanol.

EXAMPLE 2

A separate batch of di-($\beta$-hydroxyethyl) ether of hydroquinone, also having an APHA color of 10, was similarly divided into samples, one of which was utilized as a control and two others of which were each admixed with a different amount of the cyclic phosphite employed in Example 1. These three samples were then maintained in molten condition at a temperature ranging from 135 to 140° C. for 150 hours, which time the respective APHA colors were determined. The table below gives the results:

| Sample | Phosphite, percent | APHA color |
|---|---|---|
| Control | | 120 |
| A | 0.5 | 30 |
| B | 0.6 | 30 |

EXAMPLE 3

Two samples were obtained from another batch of di-($\beta$-hydroxyethyl) ether of hydroquinone, the APHA color of which was 10. One sample was admixed with a small amount of 1,4-cyclohexane-dimethylene-bis(cyclic-2,2-dimethyl-trimethylene phosphite); the other was kept as a control. Both samples were then heated to 135° C. and maintained in molten condition at that temperature for 148 hours, whereupon the APHA color of each was determined. The results appear below:

| Sample | Phosphite, percent | APHA color |
|---|---|---|
| Control | | 55 |
| A | 0.1 | 20 |

A definite improvement in the color stability of the hydroquinone ether was provided by the cyclic phosphite.

EXAMPLE 4

Two additional samples of the di-($\beta$-hydroxyethyl) ether of hydroquinone of Example 2 were respectively admixed with different amounts of the cyclic phosphite employed in Example 3. These two samples were then subjected to the heating conditions shown in Example 2, and their individual APHA colors were thereafter determined, with the following results:

| Sample | Phosphite, percent | APHA color |
|---|---|---|
| Control | | 120 |
| A | 0.2 | 30 |
| B | 0.3 | 20 |

EXAMPLE 5

From a further batch of di-($\beta$-hydroxyethyl) ether of hydroquinone having an APHA color of 5, two samples were prepared. One was admixed with a small amount of the cyclic phosphite employed in Example 3, the other being kept as a control. Both samples were then subjected in the molten condition to a temperature of 130 to 135° C. for 155 hours, their respective APHA colors thereupon being determined. The results are set forth below:

| Sample | Phosphite, percent | APHA color |
|---|---|---|
| Control | | 110 |
| A | 0.25 | 5 |

EXAMPLE 6

A quantity of the monomethyl ether of hydroquinone was prepared, its APHA color being 5. Cyclic-2,2-dimethyltrimethylene 4-methoxyphenyl phosphite was admixed in a small amount with a sample of such hydroquinone ether. Such sample was then heated to liquefy the same and thereafter maintained at 90° C. for 1 hour while air was bubbled therethrough. The APHA color of the sample was then determined, with the following result:

Sample ------------------------------------- A
Percent phosphite -------------------------- 1.1
APHA color --------------------------------- 5

Despite the accelerated oxidation effect resulting from the indicated conditions, the cyclic phosphite imparted adequate stability to the hydroquinone ether so that its color was satisfactorily maintained.

The APHA color value was determined on the basis of a 100 cc. solution of the sample in acetone.

The invention has been described in considerable detail with particular reference to certain preferred embodiments thereof, but it will be understood that variations and modifications can be effected within the spirit and scope of the invention as described hereinabove.

I claim:

1. A composition comprising (1) a di-hydroxyalkyl ether of hydroquinone wherein each hydroxylalkyl group has 1 to 4 carbon atoms; and (2), in an amount effective to inhibit the discoloration of said hydroquinone ether, a cyclic phosphite of the formula

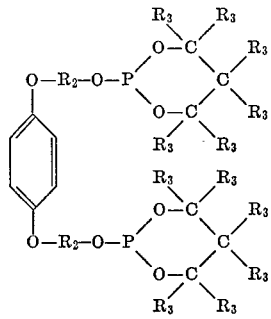

or the formula

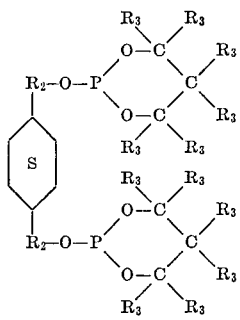

wherein $R_2$ is an alkylene group having 1 to 4 carbon atoms, $R_3$ is H or an alkyl group having 1 to 4 carbon atoms, and S indicates that the ring is saturated.

2. A composition according to claim 1, in which the cyclic phosphite is present in an amount to provide up to about 0.1% of P based on the weight of the hydroquinone ether.

3. A composition according to claim 1, in which the hydroquinone ether is di-($\beta$-hydroxyethyl)ether of hydroquinone, and the cyclic phosphite is p-phenylene-bis(oxyethylene)-bis-(cyclic - 2,2 - dimethyl-trimethylene phosphite).

4. A composition according to claim 3, which contains about 0.2 to about 0.8% of said cyclic phosphite based on the weight of said hydroquinone ether.

5. A composition according to claim 1, in which the hydroquinone ether is di-($\beta$-hydroxyethyl)ether of hydroquinone, and the cyclic phosphite is 1,4-cyclohexane-dimethylene-bis-(cyclic - 2,2 - dimethyl-trimethylene phosphite).

6. A composition according to claim 5, which contains about 0.1 to about 0.4% of said cyclic phosphite based on the weight of said hydroquinone ether.

References Cited

UNITED STATES PATENTS 3,205,269    9/1965    Friedman ---------- 260—611.5

FOREIGN PATENTS

39/13,917    7/1964    Japan ------------ 260—611.5

BERNARD HELFIN, Primary Examiner